United States Patent [19]
Koenig

[11] Patent Number: 5,486,751
[45] Date of Patent: Jan. 23, 1996

[54] ELECTRONIC TRIMMING VOLTAGE REGULATOR

[75] Inventor: David J. Koenig, Wyoming, Minn.

[73] Assignee: Onan Corporation, Minneapolis, Minn.

[21] Appl. No.: 294,201

[22] Filed: Aug. 22, 1994

Related U.S. Application Data

[63] Continuation of Ser. No. 193,519, Feb. 8, 1994, abandoned, which is a continuation of Ser. No. 843,415, Feb. 27, 1992, abandoned.

[51] Int. Cl.$^6$ .................................................. H02P 9/00
[52] U.S. Cl. .............................................. 322/86; 322/87
[58] Field of Search ............................................ 322/86–88

[56] References Cited

U.S. PATENT DOCUMENTS

| | | | |
|---|---|---|---|
| 3,324,384 | 6/1967 | Jokl et al. | 322/83 |
| 3,649,903 | 3/1972 | Fiedler | 322/27 |
| 3,771,046 | 11/1973 | Harter | 322/63 |
| 4,138,634 | 2/1979 | Yukawa | 322/28 |
| 4,143,280 | 3/1979 | Kuehn et al. | 322/88 |
| 4,401,937 | 8/1983 | Morishita | 322/28 |
| 4,438,385 | 3/1984 | Sato et al. | 322/28 |
| 4,467,267 | 8/1984 | Hucker et al. | 322/61 |
| 4,634,954 | 1/1987 | Kato et al. | 322/28 |
| 4,733,157 | 3/1988 | Malesani | 322/28 |
| 4,882,531 | 11/1989 | Edwards et al. | 322/88 |

Primary Examiner—Thomas M. Dougherty
Attorney, Agent, or Firm—Merchant, Gould, Smith, Edell, Welter & Schmidt

[57] ABSTRACT

A circuit and a method for controlling excitation current to the field winding of a generator or motor. An uncontrolled current source supplies sufficient excitation current to maintain the generator output voltage at a level slightly below the seated voltage when no load is present. A controlled current source compensates for generator loading to supply additional excitation current sufficient to raise the output voltage to approximately the rated voltage.

19 Claims, 6 Drawing Sheets

5,486,751

ELECTRONIC TRIMMING VOLTAGE REGULATOR

This is a continuation, of application Ser. No. 08/193,519, filed Feb. 8, 1994, now abandoned which is the continuation of application Ser. No. 07/843,415 filed Feb. 27, 1992 now abandoned.

BACKGROUND OF THE INVENTION

1. Field of the Invention

The present invention relates to an apparatus for controlling excitation current to the field winding of a generator or motor, and more particularly to a circuit which uses an uncontrolled current source and a controlled current source to trim excitation current to a field winding.

2. Background of the Invention

In the drawings referenced herein, like numerals indicate like features.

Motors and generators can be classified as brush-type or brushless. In a brush-type machine, electrically conductive brushes connected to slip rings provide excitation current to a rotating field winding.. In brushless machines, excitation current is provided to an excitation field winding. Rotating inductors convert the magnetic flux created by the excitation field winding into current supplied to the rotating field winding, The present invention will be described in terms of a brush-type system. It will be obvious to one skilled in the art to apply the teachings of the present invention to a brushless motor or generator.

A typical brush-type system 10 is shown in FIG. 1. System 10 comprises a rotating field winding 12 comprising winding ends 24 and 26, a stationary (main) winding 14 and an automatic voltage regulator (AVR) 18. Magnetic flux created by rotating field winding 12 is converted into an AC voltage supplied to a load 16 by main winding 14. AVR 18 controls the voltage supplied to load 16 by increasing or decreasing the magnetic flux generated by winding 12 as a function of the voltage sensed across winding 14. In a typical system, the voltage supplied to load 16 is controlled by sensing the voltage across winding 14 and supplying an excitation current as a function of the voltage sensed to winding 12 through the slip rings (not shown).

A typical AVR circuit is shown generally in FIG. 2. In FIG. 2, two silicon-controlled rectifiers (SCR) 32 and 34 and two diodes 36 and 38 form a two-pulse half-controlled bridge converter capable of converting an AC voltage into a DC voltage used to control excitation current to rotating field winding 12. SCRs 32 and 34 are controlled by excitation current control 30.

SCR's are a well known and used method of controlling field current for a voltage regulator in an AC generator or a DC generator. Excitation current control 30 controls the excitation current provided to winding 12 by increasing or decreasing the turn-on time of SCRs 32 and 34. This increases or decreases the average DC current provided to winding 12 which, in turn, increases or decreases the magnetic flux generated by winding 12. An AVR constructed as in FIG. 2 is useful in the control of AC generators in widely varying conditions and under widely varying loads.

A second type of voltage regulation is shown as system 40 in FIG. 3. In FIG. 3, a center tapped winding 42 replaces winding 14 Of FIG. 1. System 40 comprises a rotating field winding 12, a center-tapped stationary (main) winding 42 and an automatic voltage regulator (AVR) 44. Magnetic flux created by rotating field winding 12 is converted into an AC voltage supplied to a load 16 by main winding 42.

AVR 44 controls the voltage supplied to load 16 by increasing or decreasing the magnetic flux generated by winding 12 as a function of the voltage sensed across winding 42. In atypical system, the voltage supplied to load 16 is controlled by sensing the voltages between winding ends 20 and 22 and center tap 46. An excitation current is provided to winding 12 as a function of the voltages sensed.

A typical AVR circuit for system 40 is shown generally in FIG. 4. In FIG. 4, two silicon-controlled rectifiers (SCR) 50 and 52 form a two-pulse midpoint converter capable of converting an AC voltage into a DC voltage used to control excitation current to rotating field winding 12. SCRs 50 and 52 are controlled by excitation current control 54. Excitation current control 54 controls the excitation current provided to winding 12 by increasing or decreasing the turn-on time of SCRs 50 and 52. This increases or decreases the average DC current provided to winding-12 which, in turn, increases or decreases the magnetic flux generated by winding 12. Like the AVR shown in FIG. 2, an AVR constructed as in FIG. 4 is useful in the control of AC generators in widely varying conditions and under widely varying loads.

AVRs 18 and 44 provide feedback control over the magnetic flux generated by winding 12, in a generator or motor, but at a cost. An AVR design based on active components such as SCRs is generally more costly than a purely passive design. For one thing, an SCR is more expensive than a diode. In addition, each SCR requires the addition of the support circuitry needed to turn the SCR on and off as a function of the excitation current required. Passive diodes cannot, however, be used in the place of the SCRs shown in FIGS. 2 and 4 without relinquishing control over the excitation current.

In the case of stand-alone generators, AVRs based on active components such as SCRs face an additional problem. Since the AVR needs power to turn on its SCRs, no excitation current is provided until the voltage generated is sufficient to power the SCRs. To Counter this, stand-alone generators must either be provided with an independent energy source to power the active components when the generator is first turned on or the AVR must be designed to remain quiescent for the time necessary for the residual voltage to reach the level needed to power the active components. In the latter case, the generator operates without control while the generated voltage ramps up. This may require additional circuitry for field flashing.

It is desirable to minimize the number of active components in an AVR both to minimize cost and design complexity. What is needed is a method of using passive diodes to replace one or more of the SCRs in a automatic voltage regulator while maintaining the control necessary to trim the voltage supplied to a widely varying load. The present invention meets that need.

SUMMARY OF THE INVENTION

The present invention provides a circuit and a method for controlling excitation current to the field winding of a generator or motor. An uncontrolled voltage converter converts a voltage in order to supply one level of excitation current. A controlled voltage converter converts a voltage in order to supply an additional level of excitation current under control of voltage sensing apparatus.

According to another aspect of the present invention, an excitation system is disclosed which can be used to provide an excitation current useful in generating a controlled magnetic flux. The excitation system comprises a voltage reference means for establishing a reference voltage between a magnetic flux sensor such as a main or auxiliary winding and a rotating field winding. The excitation system further comprises a first voltage conversion means for converting voltage from the magnetic flux sensor into a first level of excitation current and second voltage conversion means for converting voltage from the sensor to provide a controlled level of additional excitation current.

According to yet another aspect of the present invention, an uncontrolled current source supplies sufficient excitation current to maintain the generator output voltage at a level slightly below the rated voltage when no load is present. A controlled current source compensates for generator loading to supply additional excitation current sufficient to raise the output voltage to approximately the rated voltage.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may also be possible and may be utilized and structural changes may be made without departing from the scope of the present invention.

Figure 3:
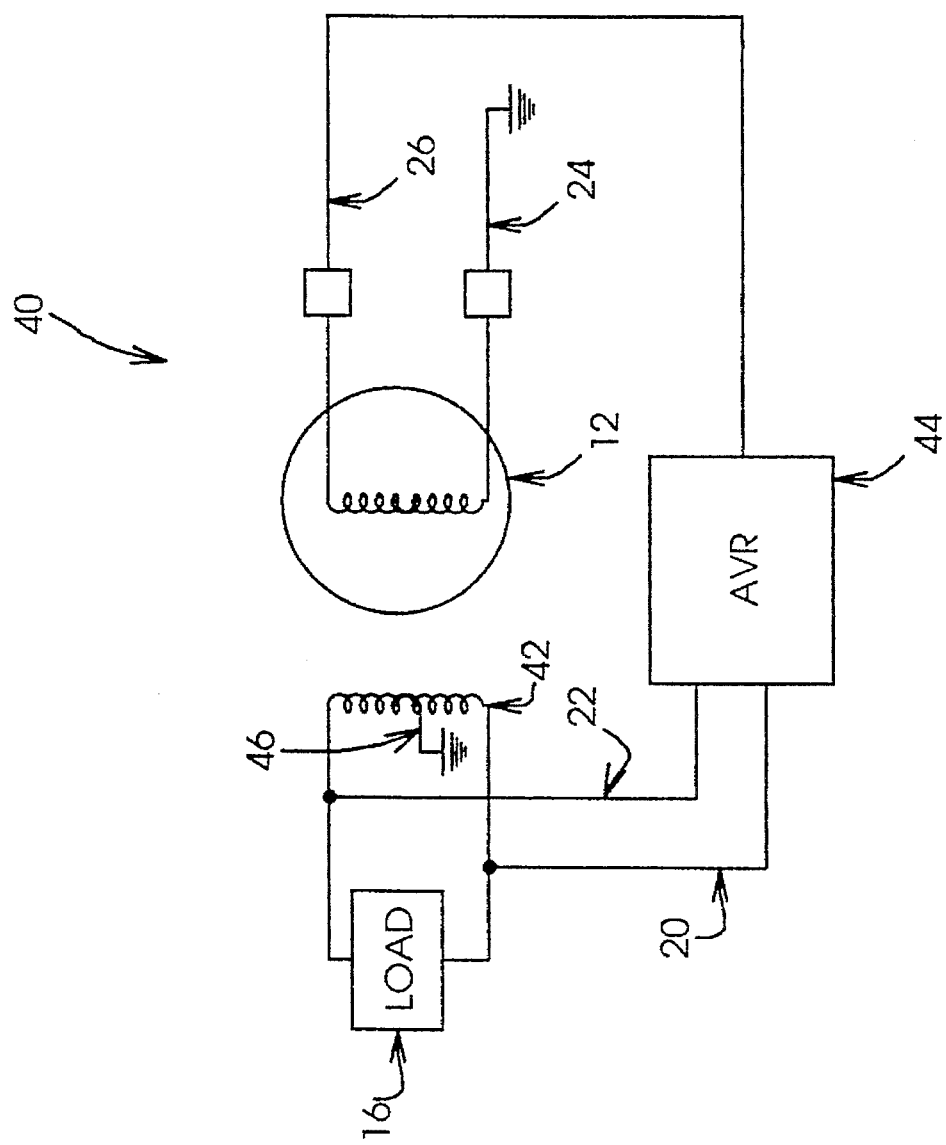
FIG. 3 is an electrical block diagram representation of a midpoint-controlled generator.
Figure 5:
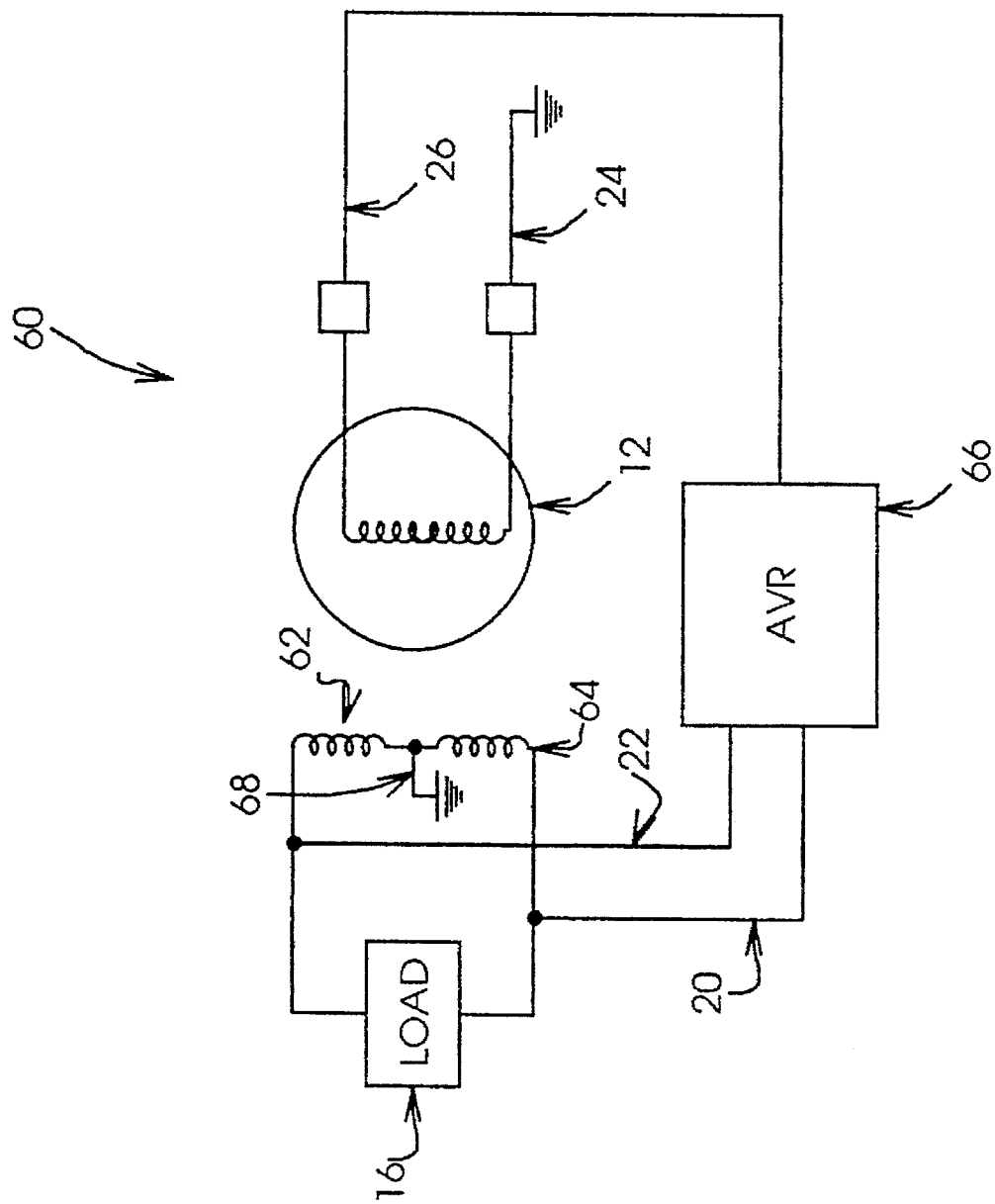
FIG. 5 is an electrical block diagram representation of a tap-controlled generator having an automatic voltage regulator according to the present invention.

A generator 60 is shown generally in FIG.. 5. In FIG. 5, two windings 62 and 64 replace winding 42 of FIG. 3. System 60 comprises a rotating field winding 12, a first stationary winding 62, a second stationary winding 64 and an automatic voltage regulator (AVR) 66. Magnetic flux created by rotating field winding 12 is converted into an AC voltage supplied to a load 16 by windings 62 and 64.

AVR 66 controls the voltage supplied to load 16 by increasing or decreasing the magnetic flux generated by winding 12 as a function of the voltage sensed across windings 62 and 64. In one embodiment, the voltage supplied to load 16 is controlled by sensing the voltages between winding ends 20 and 22 and juncture 68 of windings 62 and 64 and providing an excitation current to winding 12 as a function of the voltages sensed.

Figure 6:
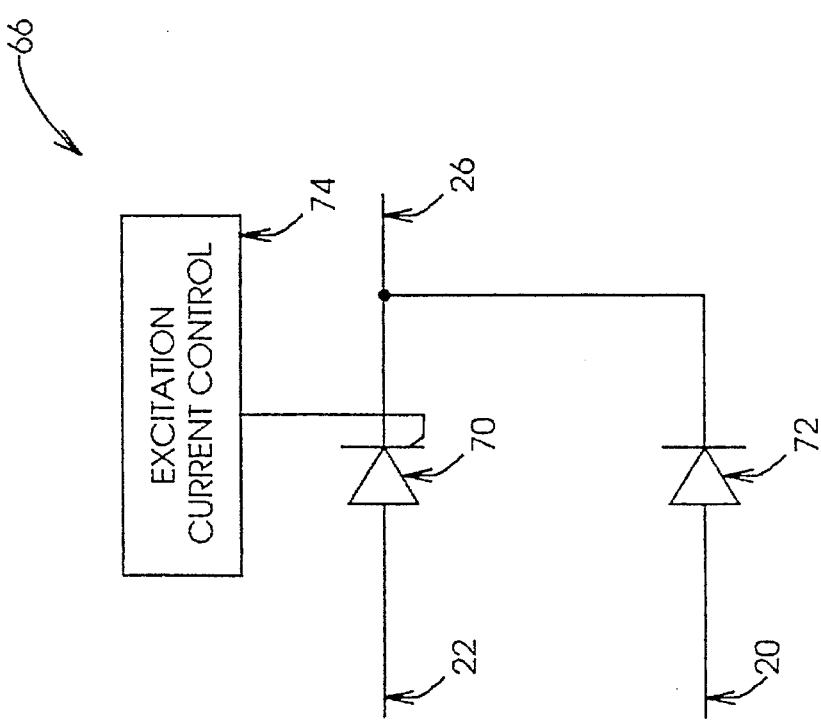
FIG. 6 is an electrical block diagram representation of one embodiment of the automatic voltage regulator of FIG. 5.

A typical AVR circuit for system 60 is shown generally in FIG. 6. In FIG. 6, a silicon-controlled rectifier (SCR) 70 and a passive diode 72 form a two-pulse converter capable of converting an AC voltage into a DC voltage used to control excitation current to rotating field winding 12. AVR 66 can be powered either with the voltage sensed at 20 and 22 or from an auxiliary winding used in conjunction with stationary windings 62 and 64.

SCR 70 provides a controlled voltage converter which operates under the control of excitation current control 74. Excitation current control 74 controls the excitation current provided to winding 12 by increasing or decreasing the turn-on time of SCR 70. This increases or decreases the average DC current provided to winding 12 which, in turn, increases or decreases the magnetic flux generated by winding 12. Like the AVRs shown in FIGS. 2 and 4, an AVR constructed as in FIG. 6 is useful in the control of AC generators in widely varying conditions and under widely varying loads.

As can be seen in FIG. 5, a voltage reference is established between the flux sensing means comprising windings 62 and 64 and the rotating winding. In the embodiment shown, this is done by connecting juncture 68 and winding end 24 to ground. It will be understood by those skilled in the art that other mechanisms, such as a conductor connecting end 24 to juncture 68, could be used to establish the voltage reference.

Figure 4:
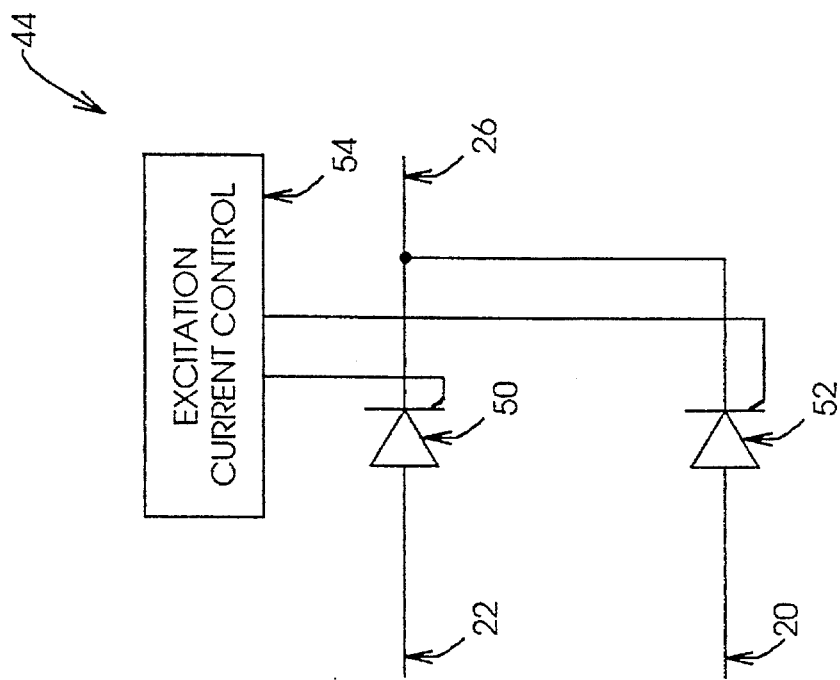
FIG. 4 is an electrical block diagram representation of a typical two pulse midpoint converter such as would be used in a generator like that shown in FIG. 3.
Figure 2:
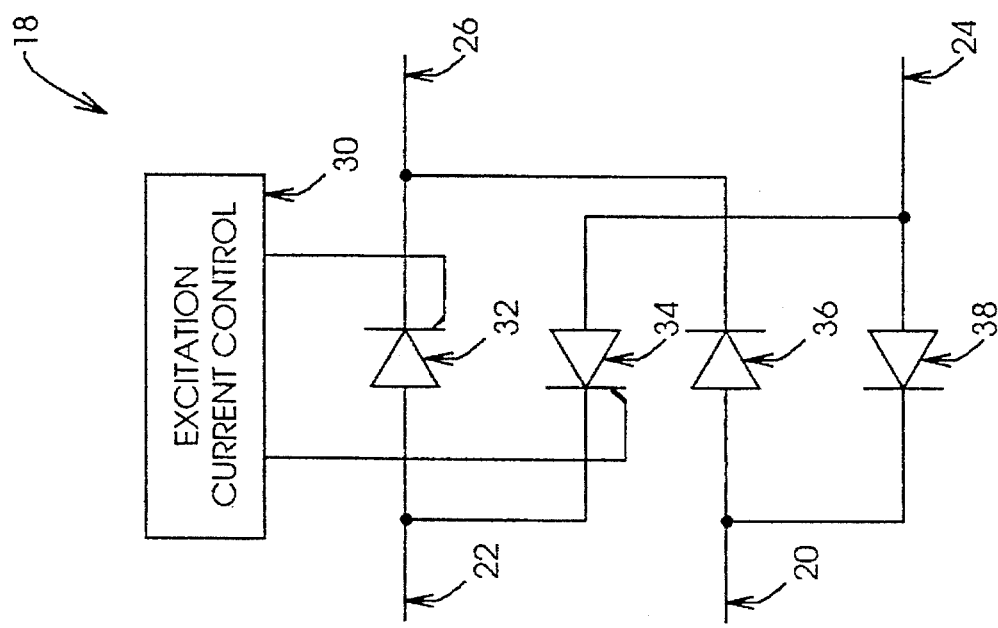
FIG. 2 is an electrical block diagram representation of a typical two pulse half-controlled bridge converter such as would be used in a generator like that shown in FIG. 1.

The AVR constructed as in FIG. 6 offers an advantage over the AVRs of FIGS. 2 and 4. Passive diode 72 provides an uncontrolled voltage converter that appears as just a single diode drop in line with half the excitation system. A system constructed according to the present invention will begin feeding excitation energy to winding 12 at anything over the diode drop. This eliminates the design complications inherent in AVRs constructed with active components described above.

In one embodiment of the circuits of FIGS. 5 and 6, windings 62 and 64 are sized such that the voltage across 64 is sufficient to maintain the generator at slightly below the nominal voltage when there is no load present. This approach reduces the range of operating parameters required of SCR 70. In this embodiment, SCR 70 is part of a trimming circuit used to provide any additional excitation current necessary to compensate for variations in operating conditions or in load 16.

Figure 1:
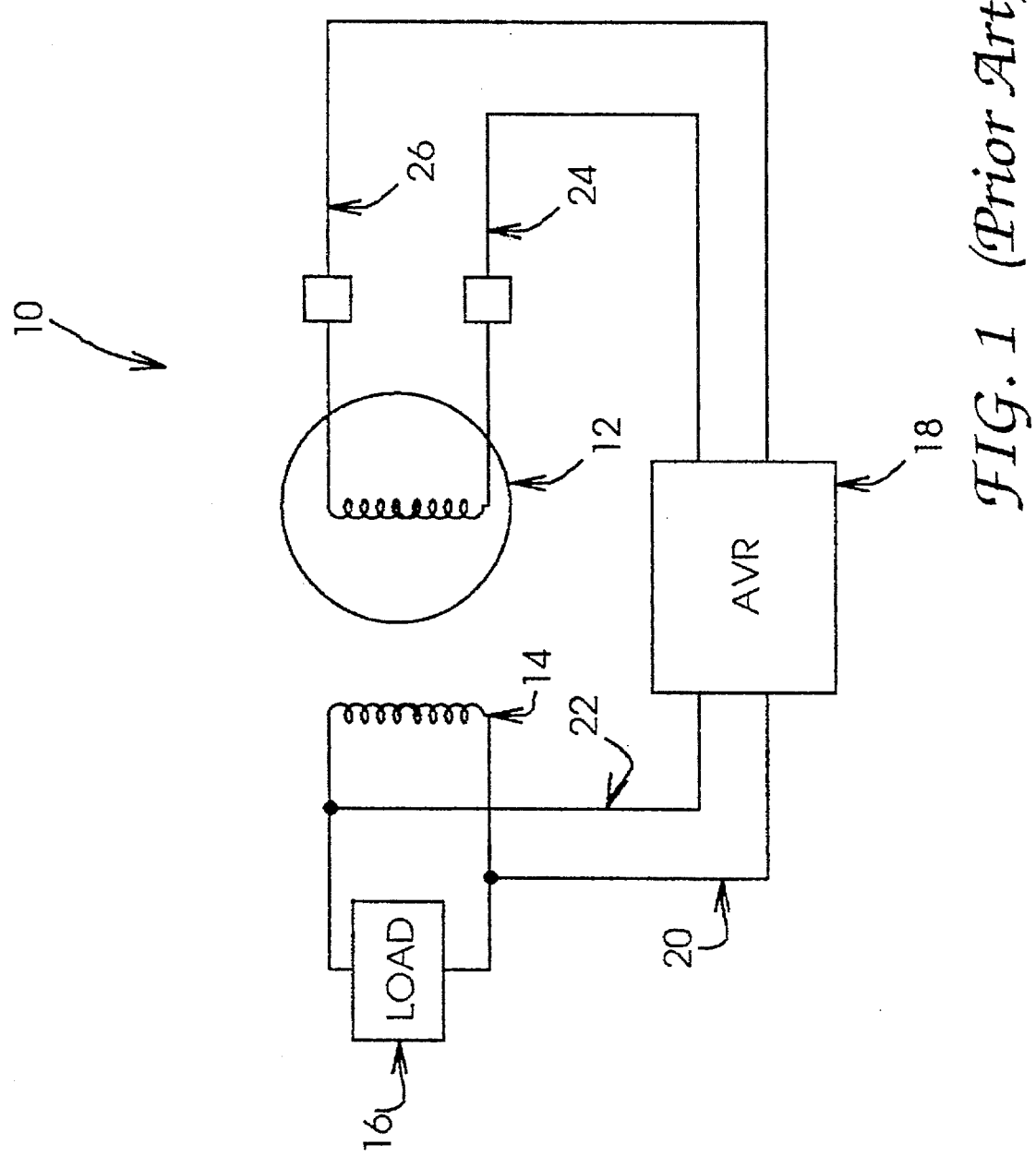
FIG. 1 is an electrical block diagram representation of a typical bridge-controlled generator.
Figure 7:
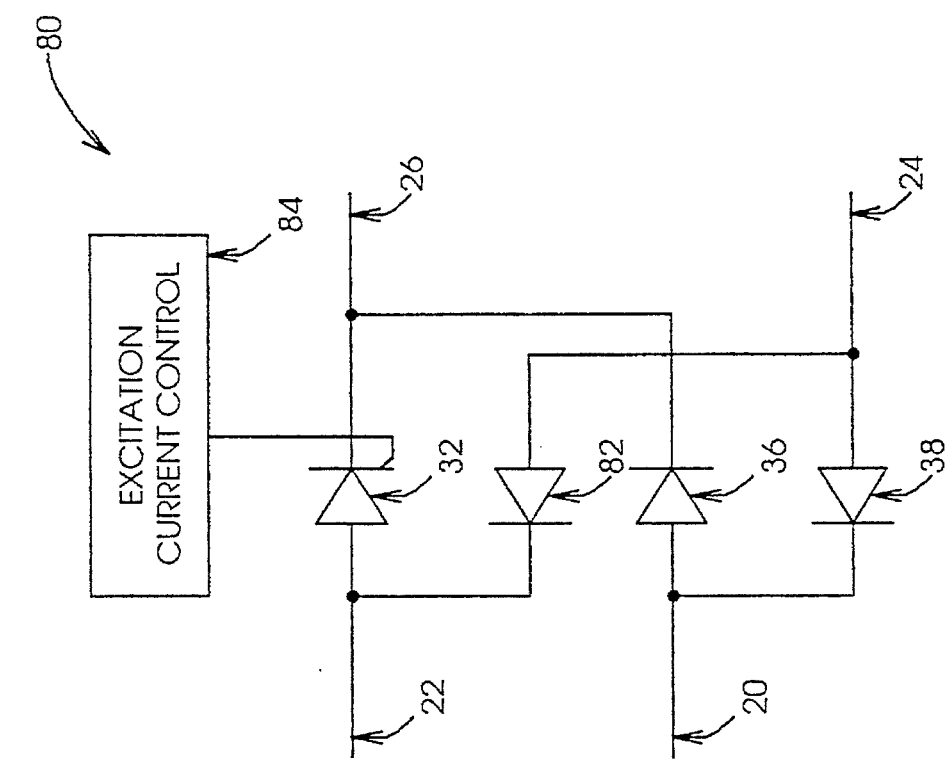
FIG. 7 is an electrical block diagram representation of one embodiment of an automatic voltage regulator useful in bridge-controlled generators according to the present invention.

The teachings of the present invention can be applied to the bridge-controlled generator shown in FIG. 1. In one embodiment, AVR 18 in FIG. 1 is replaced by an AVR 80 constructed according to the present invention. AVR 80 is shown generally in FIG. 7. In FIG. 7, SCR 34 shown in FIG. 2 is replaced with a passive diode 82 to form an uncontrolled voltage converter. Excitation current control circuit 30 is replaced by excitation current control circuit 84. AVR 80 can be powered either with the voltage sensed at 20 and 22 or from an auxiliary winding used in conjunction with stationary winding 12.

Excitation current control 84 controls the excitation current provided to winding 12 by increasing or decreasing the turn-on time of SCR 32. This increases or decreases the average DC current provided to winding 12 which, in turn, increases or decreases the magnetic flux generated by winding 12. As is well known in the art, the voltage reference is provided by the bridge configuration used for the elements of AVR 80.

In one embodiment of a bridge-controlled circuit constructed according to the present invention, generator 10 and AVR 80 are designed such that the excitation current across the passive side of the full-wave converter is sufficient to maintain the generator at slightly below the nominal voltage when there is no load present. This approach reduces the range of operating parameters required of SCR 32. In this embodiment, the half of the full-wave converter which includes SCR 32 is part of a trimming circuit used to provide the additional excitation current necessary to compensate for variations in operating conditions and loads An AVR constructed as in FIG. 7 is useful in the control of AC generators in widely varying conditions and under widely varying loads. It has an advantage over the circuit of FIG. 2 in that passive diode 82 provides just a single diode drop in line with half the excitation system. A system constructed according to FIG. 7 will begin feeding excitation energy to winding 12 at anything over the diode drop.

Auxiliary windings can be used in conjunction with the main windings to isolate the circuitry used to sense and control the magnetic flux generated by field winding 12. In one embodiment, AVR 18 of FIG. 1 is removed and windings 62 and 64 of FIG. 5 are mounted as a set of auxiliary windings used in conjunction with stationary winding 14. AVR 66 is connected to windings 62 and 64 and operates in conjunction with windings 62 and 64 to control the excitation current supplied to field winding 12. In this embodiment, both the energy to power AVR 66 and the sensed voltage are obtained from windings 62 and 64.

Figure 8:
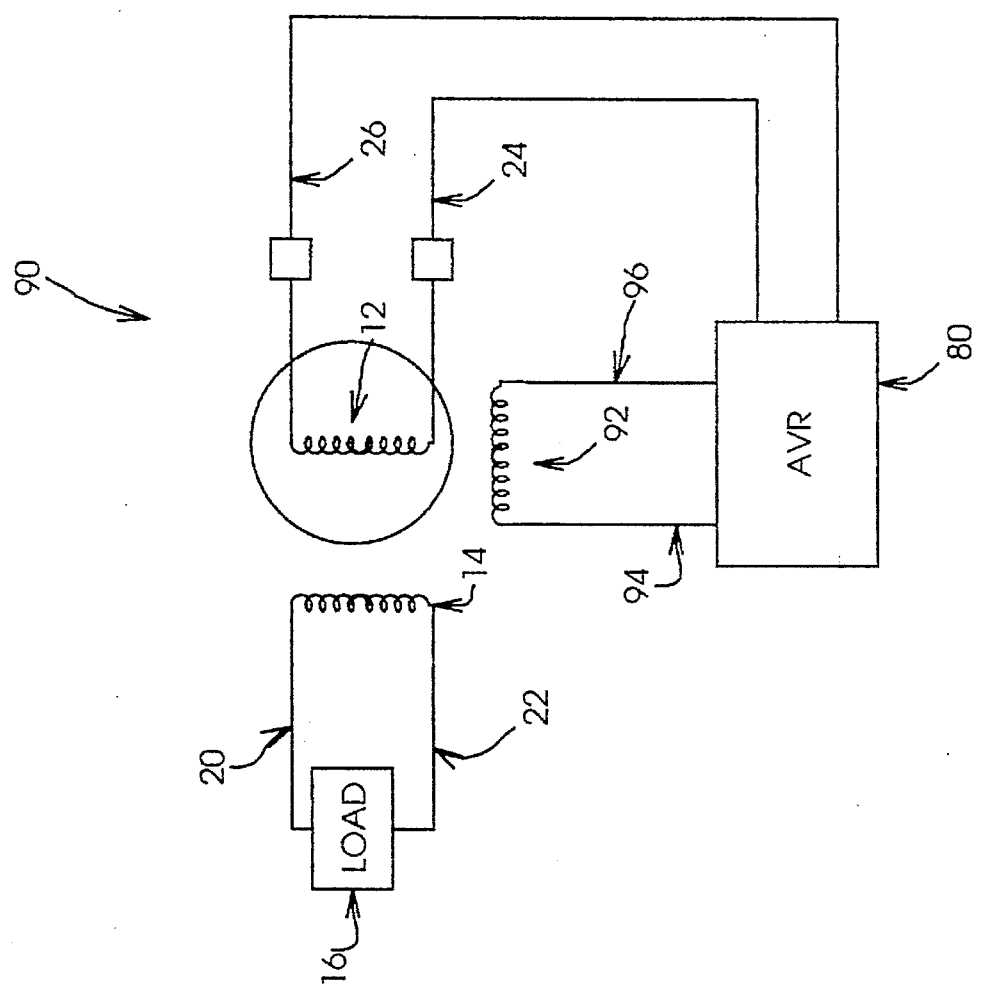
FIG. 8 is an electrical block diagram representation of a bridge-controlled generator which uses an auxiliary winding to sense magnetic flux generated by a rotating field winding.

In an alternate auxiliary winding embodiment, a single auxiliary winding is connected to an AVR like AVR 80 in FIG. 7. Such an embodiment is shown illustrated generally in FIG. 8. In FIG. 8, auxiliary winding 92 is placed in the magnetic flux generated by rotating field winding 12. AVR 8C is powered by the voltage induced across auxiliary winding 92. In addition, the voltage induced across winding 92 is rectified by AVR 80 so as to provide excitation current to rotating field winding 12. The operation of AVR 80 is as described previously.

Although the present invention has been described with reference to the preferred embodiments, those skilled in the art will recognize that changes may be made in form and detail without departing from the spirit and scope of the invention. In particular, although the embodiments described teach the use of an SCR to control the flow of excitation current as a function of the sensed voltage, it should be obvious that other active switching devices (such as transistors) could be used without departing from the scope of the present invention. In addition, the present teachings can be applied advantageously to provide excitation current to the control windings of electric motors.

What is claimed is:

1. In a generator comprising a converter winding for converting magnetic flux into alternating current and a generator field winding for altering the magnetic flux as a function of excitation current, a generator excitation system for providing the excitation current to the generator field winding as a function of the voltage measured across the converter winding, the generator excitation system comprising:

voltage conversion means, coupled between the converter winding and the generator field winding, for providing an uncontrolled, level of excitation current sufficient to run the generator slightly below nominal voltage with no load and for providing a controlled, level of excitation current which, when superimposed on said uncontrolled level of excitation current, provides excitation current sufficient to run the generator at approximately nominal voltage over a wide range of conditions and loads, the voltage conversion means including one single silicon-controlled rectifier and at least one diode;

wherein said diode, coupled between the converter winding and the generator field winding, provides the uncontrolled, level of excitation current; and wherein said silicon-controlled rectifier, coupled between the converter winding and the generator field winding, provides the controllable, level of excitation current.

2. A generator, comprising:

a field winding having a first and a second end;

means for rotating said field winding;

flux sensing means for sensing the magnetic flux generated by said rotating field winding;

excitation current means for providing, as a function of the magnetic flux generated by said rotating field winding, excitation current to said field winding in order to generate controlled magnetic flux, said excitation current means comprising:

voltage reference means for establishing a reference voltage between said flux sensing means and said field winding;

first voltage conversion means connected between said flux sensing means and said field winding for converting power from said flux sensing means to provide an uncontrolled level of excitation current sufficient to induce a first level of magnetic flux; and second voltage conversion means connected between said flux sensing means and said field winding for converting power from said flux sensing means to provide a controllable level of excitation current which, when added to said uncontrolled level of excitation current, acts to induce a second level of magnetic flux;

wherein the flux sensing means comprises first and second windings located in the magnetic flux generated by said rotating field winding, wherein each of said first and second windings have a first end and a second end and wherein the second end of said first winding is connected to the first end of said second winding;

wherein said first voltage conversion means comprises a diode connected between the first end of said first winding and the first end of said field winding;

wherein said second voltage conversion means comprises a silicon-controlled rectifier connected between the second end of said second winding and the first end of said field winding; and wherein said voltage reference means comprises a conductor connecting the second end of said first winding to the second end of said field winding.

3. A generator, comprising:

a rotating field winding having a first and a second end;

flux sensing means, coupled with the rotating field winding, for sensing a magnetic flux generated by said rotating field winding; and excitation current means, connecting between the flux sensing means and the rotating field winding, for providing, as a function of the magnetic flux generated by said rotating field winding, excitation current to said rotating field winding in order to generate controlled magnetic flux, said excitation current means comprising:

voltage reference means, coupled between a connecting juncture of said flux sensing means and one end of said rotating field winding, for establishing a reference voltage;

first voltage conversion means connected between said flux sensing means and said rotating field winding for converting power from said flux sensing means to provide an uncontrolled level of excitation current sufficient to induce a first level of magnetic flux; and second voltage conversion means connected between said flux sensing means and said rotating field winding for converting power from said flux sensing means to provide a controllable level of excitation current which, when added to said uncontrolled level of excitation current, acts to induce a second level of magnetic flux.

4. Amended) The generator according to claim 3, wherein the flux sensing means comprises first and second windings located in the magnetic flux generated by said rotating field winding, wherein each of said first and second windings have a first end and a second end and wherein the second end of said first winding is connected to the first end of said second winding at the connecting juncture;

wherein said first voltage conversion means comprises at least one diode connected between the first end of said first winding and the first end of said field winding; and wherein said second voltage conversion means comprises one single silicon-controlled rectifier connected between the second end of said second winding and the first end of said field winding.

5. The generator according to claim 4 wherein said voltage reference means comprises a conductor connecting the second end of said first winding to the second end of said field winding.

6. The generator according to claim 4 wherein said voltage reference means comprises:

a first conductor connecting the second end of said first winding to ground; and a second conductor connecting the second end of said field winding to ground.

7. The excitation system according to claim 4 wherein said voltage reference means comprises:

a second diode connected between the first end of said first winding and the second end of said field winding; and a third diode connected between the second end of said second winding and the second end of said field winding.

8. The generator according to claim 3:

wherein the flux sensing means comprises a main winding located in the magnetic flux generated by said rotating field winding, said main winding having a first end and a second end;

wherein said first voltage conversion means comprises a first diode connected between the first end of said main winding and the first end of said field winding;

wherein said second voltage conversion means comprises a silicon-controlled rectifier connected between the second end of said main winding and the first end of said field winding; and wherein said voltage reference means comprises:

a second diode connected between the first end of said main winding and the second end of said field winding; and a third diode connected between the second end of said main winding and the second end of said field winding.

9. An electronic trimming voltage regulator for use in a generator having a generator field winding and an converter winding, each of said windings having a first end and a second end, said trimming voltage regulator comprising:

rectifier means electrically connected between the converter winding and the field winding for providing excitation current to the field winding, said rectifier means comprising:

first transmission means for passing a first, uncontrolled, level of excitation current, wherein said first, uncontrolled, level of excitation current is approximately proportional to the roll, age across said converter winding;

second transmission means connected to said first transmission means for passing a second controlled level of excitation current to be added to said first level of excitation current;

voltage reference means, coupled between a connecting juncture of the converter winding and one end of the field winding, for establishing a voltage reference; and control means, connected to one end of said second transmission means of said rectifier means, for controlling said second transmission means to provide a desired level of excitation current.

10. The electronic trimming voltage regulator of claim 9:

wherein the first transmission means comprises a diode connected between the first end of the converter winding and the first end of the field winding; and wherein the second transmission means comprises electronic switching means, connected between the second end of the converter winding and the first end of the field winding, for regulating, under control of said control means, said second level of excitation current provided to the field winding.

11. The electronic trimming voltage regulator of claim 10 wherein the electronic switching device comprises a silicon-controlled rectifier.

12. A generator, comprising:

a field winding having a first and a second end;

means for rotating said field winding;

flux sensing means for sensing the magnetic flux generated by said rotating field winding;

excitation current means for providing, as a function of the magnetic flux generated by said rotating field winding, excitation current to said field winding in order to generate controlled magnetic flux, said excitation current means comprising:

voltage reference means for establishing a reference voltage between said flux sensing means and said field winding;

first voltage conversion means connected between said flux sensing means and said field winding for converting power from said flux sensing means to provide an uncontrolled level of excitation current sufficient to induce a first level of magnetic flux; and second voltage conversion means connected between said flux sensing means and said field winding for converting power from said flux sensing means to provide a controllable level of excitation current which, when added to said uncontrolled level of excitation current, acts to induce a second level of magnetic flux;

wherein the flux sensing means comprises first and second windings located in the magnetic flux generated by said rotating field winding, wherein each of said first and second windings have a first end and a second end and wherein the second end of said first winding is connected to the first end of said second winding;

wherein said first voltage conversion means comprises a diode connected between the first end of said first winding and the first end of said field winding;

wherein said second voltage conversion means comprises a silicon-controlled rectifier connected between the second end of said second winding and the first end of said field winding; and wherein said voltage reference means comprises:
a first conductor connecting the second end of said first winding to ground; and
a second conductor connecting the second end of said field winding to ground.

13. A method of providing excitation current to a control winding in a generator or electric motor in order to generate a magnetic flux, the method comprising:

providing an AC voltage;

providing a passive voltage conversion means for converting the AC voltage to a first excitation current, wherein the first excitation current is an uncontrolled, level of excitation current sufficient to run the generator slightly below nominal voltage;

providing an active voltage conversion means for converting, under control of an activation signal, the AC voltage to a second excitation current;

adding said second excitation current to said first excitation current to form a composite excitation current; and controlling the activation signal so as to provide a desired level of composite excitation current.

14. The method according to claim 13 wherein the method further comprises:

providing control means responsive to said AC voltage for generating an error signal as a function of the difference between said AC voltage and a reference voltage; and generating the activation signal as a function of the error signal in order to regulate the level of composite excitation current.

15. The method according to claim 13 wherein:

the step of providing a passive voltage conversion means comprises providing means capable of converting energy in the first half cycle of said AC voltage to a first excitation current; and the step of providing an active voltage conversion means comprises providing means capable of converting a portion of the energy in the second half cycle of said AC voltage to a second excitation current.

16. A method of providing excitation current to a control winding in a generator or electric motor in order to generate a magnetic flux, the method comprising providing an AC voltage, which comprises the steps of:
rotating said control winding;
providing a second winding located in the magnetic flux of said control winding;
connecting said second winding to said passive voltage conversion means, said active voltage conversion means and said control means in order to control the level of excitation current as a function of the magnetic flux generated by said control winding;

providing a passive voltage conversion means for converting the AC voltage to a first excitation current;

providing an active voltage conversion means for converting, under control of an activation signal, the AC voltage to a second excitation current;

adding said second excitation current to said first excitation current to form a composite excitation current;

controlling the activation signal so as to provide a desired level of composite excitation current;

providing control means responsive to said AC voltage for generating an error signal as a function of the difference between said AC voltage and a reference voltage; and generating the activation signal as a function of the error signal in order to regulate the level of composite excitation current.

17. The method according to claim 16 wherein the step of providing a passive voltage conversion means comprises providing means capable of producing a first excitation current sufficient to induce a voltage in the second winding approximately equal to the reference voltage.

18. An excitation system for providing, as a function of voltage from an AC power source having a first end and a second end, excitation current which can be supplied to a generator field winding having a first end and a second end in order to generate controlled magnetic flux, said excitation system comprising:

input means, having a first end and a second end, for sensing AC voltage from the AC power source, the first end of the input means being coupled with the first end of the AC power source, the second end of the input means being coupled with the second end of the AC power source;

output means, having a first end, for providing the excitation current to the generator field winding, the first end of the output means being coupled with the first end of the generator field winding;

voltage conversion means, coupled between said input means and said output means, for converting an AC voltage supplied to said input means to provide an uncontrolled level of excitation current and for converting an AC voltage supplied to said input means to provide a controllable level of excitation current, the voltage conversion means including one single silicon-controlled rectifier and at least one diode;

wherein said diode, coupled between the first end of the input means and the first end of the output means, converts an AC voltage supplied to said input means to provide the uncontrollable level of excitation current; and wherein said silicon-controlled rectifier, coupled between the second end of the input means and said first end of the output means, converts the AC voltage supplied to said input means to provide the controllable level of excitation current.

19. An excitation system according to claim 18, further comprising voltage reference means, coupled between a connecting juncture of the AC power source and the second end of the generator field winding, for establishing a reference voltage.

* * * * *

UNITED STATES PATENT AND TRADEMARK OFFICE
CERTIFICATE OF CORRECTION

PATENT NO. : 5,486,751

DATED : January 23, 1996

INVENTOR(S) : Koenig

It is certified that error appears in the above-identified patent and that said Letters Patent is hereby corrected as shown below:

```
     Abstract, line 6 "seated" should read --rated--

Col. 2, line 6 "atypical" should read --a typical--

Col. 2, line 19 delete " - " after the word "winding"

Col. 2, line 40 "Counter" should read --counter--

Col. 5, line 11 insert --16.-- after the word "loads"

Col. 5, line 35 "8C" should read --80--

Col. 7, line 14 delete "Amended)" after the numeral "4."
```

Signed and Sealed this

Thirty-first Day of December, 1996

*Attest:*

BRUCE LEHMAN

*Attesting Officer*    *Commissioner of Patents and Trademarks*